A. HEYMOSS.
TOWING DEVICE.
APPLICATION FILED APR. 19, 1920.

1,408,002.

Patented Feb. 28, 1922.
2 SHEETS—SHEET 1.

INVENTOR
Alois Heymoss
BY
ATTORNEYS

UNITED STATES PATENT OFFICE.

ALOIS HEYMOSS, OF DETROIT, MICHIGAN.

TOWING DEVICE.

1,408,002.  Specification of Letters Patent.  Patented Feb. 28, 1922.

Application filed April 19, 1920. Serial No. 374,861.

*To all whom it may concern:*

Be it known that I, ALOIS HEYMOSS, a citizen of the United States of America, residing at Detroit, in the county of Wayne and State of Michigan, have invented certain new and useful Improvements in Towing Devices, of which the following is a specification, reference being had therein to the accompanying drawings.

This invention relates to an automobile towing device and my invention aims to provide a novel vehicle equipment which may be employed for towing automobiles or other vehicles which have been partially wrecked or injured so that the automobile or vehicle cannot be moved on its front or rear wheels, the device being designed to support the front or rear end of the automobile or vehicle so that it may be towed to a garage or repair shop and repaired.

My invention further aims to furnish a towing automobile or vehicle with an adjustable towing attachment, which when not in use may be retracted relative to the automobile or vehicle and thus permit of the machine being used for other purposes than that of towing or recovering wrecked cars.

My invention still further aims to furnish a vehicle with an equipment by which a portion of an automobile or similar vehicle may be elevated and conveniently attached to a towing vehicle, the equipment being simple in construction, durable and easy to operate.

Figure 1:
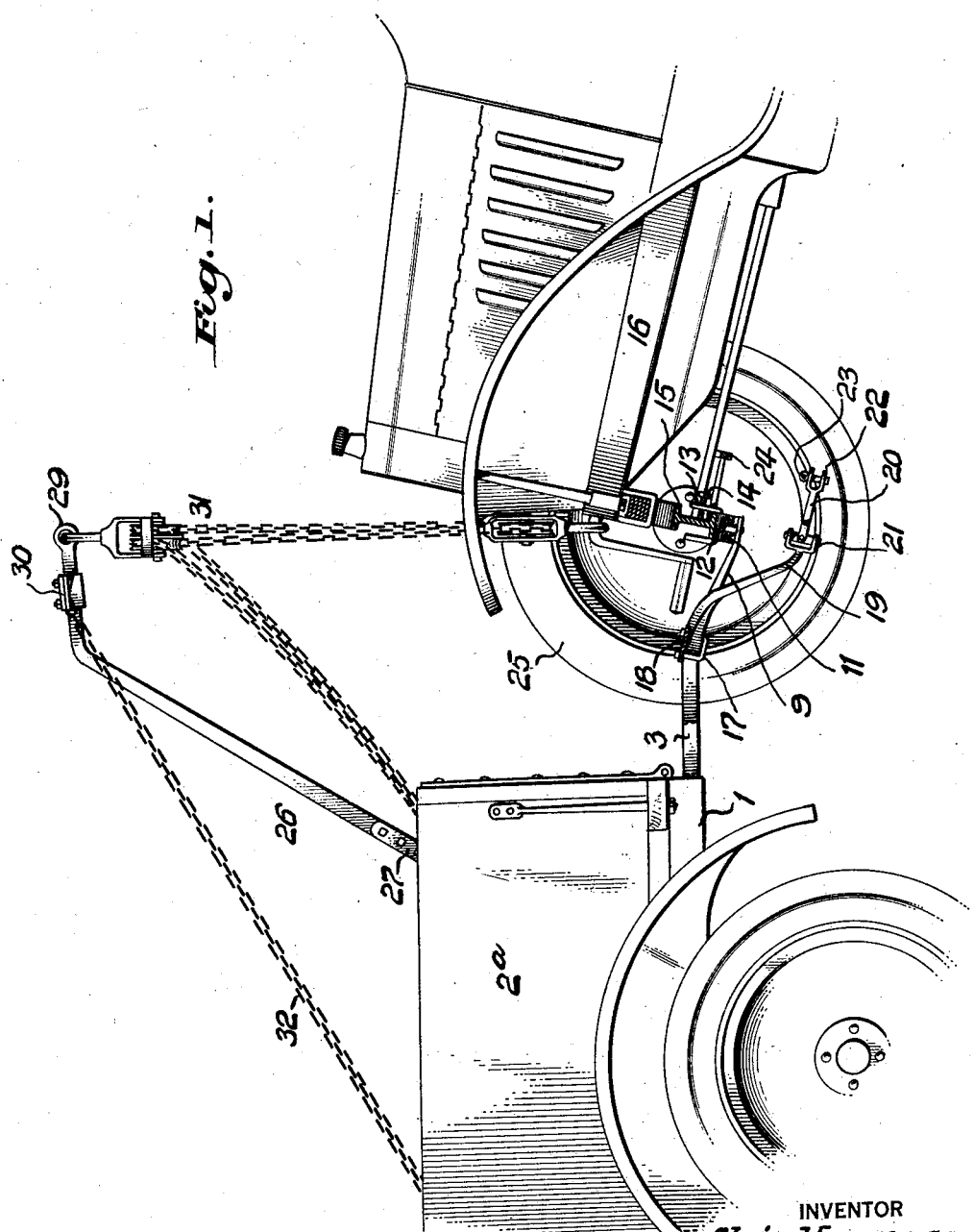
Figure 2:
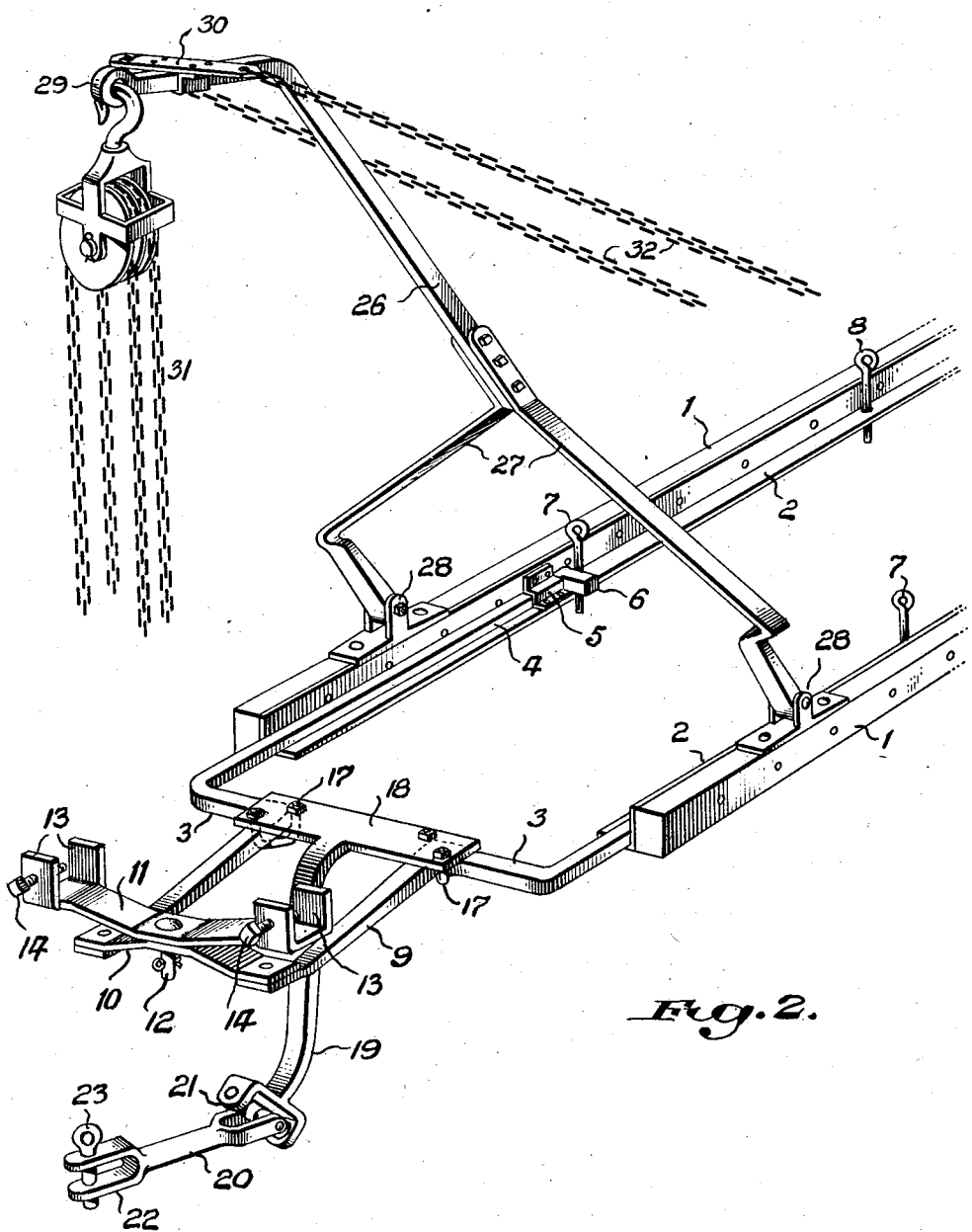

Reference will now be had to the drawings, wherein—Figure 1 is a side elevation of a portion of the towing vehicle supporting and attached to the forward end of an injured vehicle, and Fig. 2 is a perspective view of the equipment for the towing vehicle.

In the drawings, the reference numeral 1 denotes the chassis or frame of an automobile or similar vehicle that may be used for towing purposes, and the chassis 1 may be naked or devoid of body or provided with a suitable body 2ª so that the towing vehicle may be used for other purposes.

Suitably attached to the inner confronting walls of the chassis or frame 1 are angle guides 2 constituting supports for a horizontally disposed slidable yoke 3 having front arms 4 slidably retained on the angle guides 2 by straps 5 connected thereto, and said arms have stop portions 6 adapted to engage the straps 5 and limit the outward movement of the yoke relative to the rear end of the chassis 1. The arms 4 can be locked in an extended position by detachable pins 7 or similar holding means placed in engagement with the guides 2 and similar or other pins 8 may be employed for retaining the yoke in a retracted position.

The rear end of the yoke 3 terminates in a set of rearwardly projecting and somewhat inclined supporting arms 9 connected by a rocker support 10 for a transverse rocker head 11, which is held relative to the support 10 by a king bolt 12, said king bolt permitting of said rocker head having a swiveled or fifth wheel action on the rear end of the yoke. At the ends of the rocker head 11 are brackets 13 having set screws 14 and these brackets are adapted to receive one of the axles 15, a spring or some other part of a wrecked or injured automobile 16 or similar vehicle. The set screws 14 may be tightened to retain or clamp the axle 15 relative to the brackets 13. It is now apparent that the yoke 3 and the rocker head 11 constitute a carrier which permits of an end of another vehicle being carried and towed by the chassis 1.

Connected to the yoke 3 by U bolts 17 or other fastening means is a cross-head 18 having a compound curved rearwardly extending tongue 19 provided with an extension 20 which is coupled to the tongue 19 by a conventional form of universal joint 21. The tongue extension 20 has a fork 22 and a pin 23 so that it may be attached to a steering rod 24 of the automobile 16, if necessary, to prevent turning of the wheels 25 of the automobile. In a great many instances such connection is not actually necessary, but the same is provided so that any injured steering mechanism may be attached to and supported by the tongue 19.

To elevate the forward end of the automobile 16 so that it may be placed on the carrier I employ a boom 26 which has its lower end provided with diverging arms 27 pivotally supported, as at 28 on the chassis 1, or in the body 2 of the chassis, so that the boom may be lowered rearwardly on to the chassis or in the body when not in use. The upper end of the boom 26 has an eye 29 and a cross head 30. Connected to the eye 29 is a conventional form of block and tackle or chain fall generally designated 31 and this block and tackle may be attached to any convenient part at the forward end of the automobile 16 for raising the end of the automobile on to the rocker head 11 of the carrier or yoke 3.

The cross head 30 is connected by chains or other flexible members 32 to the chassis 1 or the body 2 at points forward of the pivotal connections 28, so that the boom 26 may be safely supported at an inclination or in an overhanging position at the rear end of the chassis 1. With the boom in an active position as shown in Fig. 1, it may cooperate with the carrier in sustaining the weight of the forward end of the automobile 16 while it is being towed on its rear wheels and with the automobile 16 closely coupled to the chassis 1 it can be safely and conveniently pulled or pushed in any desired direction.

It is thought that the utility and operation of my towing device will be apparent without further description, and while in the drawings there is illustrated a preferred embodiment of my invention, it is to be understood that the structural elements are susceptible to such changes, in size, shape and manner of assemblage as fall within the scope of the appended claims.

What I claim is:—

1. A vehicle towing device comprising a carrier adapted to support the forward end of a vehicle, and a tongue extending rearwardly from said carrier adapted to be connected to the steering mechanism of the vehicle to be towed.

2. A vehicle towing device as characterized in claim 1, and means above said carrier for lifting and supporting a portion of the towed vehicle thereon.

3. A vehicle towing device comprising a carrier, a rock head on said carrier for retaining a portion of a towed vehicle on said carrier, a tongue extending rearward from said carrier adapted for attachment to the towed vehicle, and means foldable relative to said carrier adapted for raising a portion of the vehicle to be towed on to said rock head.

4. A vehicle towing device as characterized in claim 3, wherein said means in the form of a boom have a raising and lowering device.

In testimony whereof I affix my signature in the presence of two witnesses.

ALOIS HEYMOSS.

Witnesses:
KARL H. BUTLER,
ANNA M. DORR.